United States Patent
Winkens (10) Patent No.: US 7,891,243 B2
(45) Date of Patent: Feb. 22, 2011

(54) SENSOR FOR THE CONTACTLESS DETECTION OF THE LEVEL OF A LIQUID AND ADHERING HIGH-CONDUCTIVITY MEDIUM, ESPECIALLY BLOOD, THROUGH A NON-METAL WALL OF A CONTAINER

(75) Inventor: Frank Winkens, Ludwigshafen (DE)

(73) Assignee: SIE Sensorik Industrie-Electronik GmbH, Viernheim (DE)

( * ) Notice: Subject to any disclaimer, the term of this patent is extended or adjusted under 35 U.S.C. 154(b) by 360 days.

(21) Appl. No.: 12/084,525

(22) PCT Filed: Oct. 9, 2006

(86) PCT No.: PCT/EP2006/009725

§ 371 (c)(1),
(2), (4) Date: May 1, 2008

(87) PCT Pub. No.: WO2007/062714

PCT Pub. Date: Jun. 7, 2007

(65) Prior Publication Data

US 2009/0158841 A1 Jun. 25, 2009

(30) Foreign Application Priority Data

Nov. 30, 2005 (DE) .................... 10 2005 057 558

(51) Int. Cl.
G01F 23/26 (2006.01)
(52) U.S. Cl. .................................................. 73/304 C
(58) Field of Classification Search ................ 73/304 C
See application file for complete search history.

(56) References Cited

U.S. PATENT DOCUMENTS 5,465,619 A * 11/1995 Sotack et al. ............. 73/304 C

FOREIGN PATENT DOCUMENTS

| DE | 19701899 A1 | * | 10/1997 |
| DE | 19945330 A1 | * | 4/2001 |
| DE | 19949985 A1 | * | 5/2001 |
| GB | 2040464 | * | 8/1980 |

* cited by examiner

Primary Examiner—Hezron Williams
Assistant Examiner—Nathaniel Kolb
(74) Attorney, Agent, or Firm—Horst M. Kasper

(57) ABSTRACT

The invention relates to a sensor for the contactless detection of the level of a liquid and adhering high-conductivity medium, especially blood, through a non-metal container wall. The sensor has a pulse generator (1) that generates brief pulses which, via a low-ohm resistor (2), namely, the measuring resistor, actuate an electrode (4) installed on the outside of the container wall. A fast-action difference amplifier that has a high common-mode rejection (6) and that taps a voltage drop at the measuring resistor (2) caused by the level-dependent pulse current, then said difference amplifier amplifies this voltage drop by a fixed factor and feeds the signal to a downstream peak detector (7) with filtering in order to obtain a level-dependent direct voltage and also feeds it to a downstream voltage comparator (8) which, by comparing the output voltage of the peak detector (7) to an adjustable setpoint voltage (9), generates a switching signal that changes from "low state" to "high state" as soon as a rising filling level causes the measuring electrode (4) to be sufficiently covered and conversely when the filling level sinks below the electrode (4) or reacts inversely to the change in the filling level as soon as the polarity of one of the stages consisting of the pulse generator (1), the difference amplifier (6), the peak detector (7) and the voltage comparator (8) is inverted.

8 Claims, 4 Drawing Sheets

Fig. 1

PRIOR ART

Fig 2:

PRIOR ART

Fig. 3:

PRIOR ART

SENSOR FOR THE CONTACTLESS DETECTION OF THE LEVEL OF A LIQUID AND ADHERING HIGH-CONDUCTIVITY MEDIUM, ESPECIALLY BLOOD, THROUGH A NON-METAL WALL OF A CONTAINER

FIELD OF THE INVENTION

The invention relates to a sensor and to a method for the contactless detection of the level of a liquid and adhering high-conductivity medium, especially blood, through a non-metal wall of a container.

DESCRIPTION OF RELATED ART

Capacitive sensors for the contactless detection of the levels of liquid media or solids (granules, powders) through non-metal container walls are widely known. Here, as a rule, the sensor is mounted on the outside wall of the container and it supplies a switching signal as soon as the inner filling level rises above or falls below the area of the "active" surface of the sensor. With this principle, the active electric field of the sensor is always influenced by the medium that is to be detected.

The plate capacitor or the "geometrically expanded" plate capacitor is always based on this fundamental physical principle. One plate of the capacitor forms the active surface of the sensor while the opposite side or the other plate constitutes the general potential to the ground or earth potential. The container wall and especially the medium to be detected have a dielectric constant $\in_r$ which is known to always be considerably greater than that of air. Therefore, the $\in_r$ of a medium to be detected causes an increase in the total capacitance of the plate capacitor as soon as the medium reaches the area of the active surface of a sensor. When a certain pre-set capacitance value is exceeded, the sensor emits a switching signal.

Various electronic methods are commonly employed and they constitute the state of the art for purposes of detecting the usually slight capacitance changes in the order of magnitude of less than 1 pf. As the highest differentiation criterion, these methods are broken down into driven and oscillatory methods.

In the case of the driven methods, usually a square-wave generator clocks a special measuring circuit, as described in German patent applications DE 19701899 A1 and DE 19945330 A1. These methods usually fulfill higher EMC requirements [EMC=electromagnetic compatibility] but are inadequate when it comes to their sensitivity and especially in terms of a special problem—which will be elaborated upon below—encountered in many applications in the realm of filling level measurement.

As far as the oscillatory methods are concerned, in most cases, the oscillation condition of a special oscillator is influenced by the measuring capacitance via an electrode system. Depending on the embodiment, when a certain pre-set capacitance value has been reached, such an oscillator either just barely starts to oscillate, or conversely, stops oscillating. The presence of the oscillation signal or the change in the oscillation amplitude is evaluated in this process. Since the threshold between oscillation and non-oscillation is infinitely small from a purely mathematical standpoint (oscillation condition), relatively high sensitivities can be achieved with little effort. The foundations of this principle were patented at the end of the 1960s by Mr. Schaller in German patent specification DE 16 73 841 C3 and are still employed nowadays in most capacitive sensors. A major drawback of oscillatory methods, however, is that there fundamentally is a very high interference susceptibility (EMC) to alternating electric fields within a wide frequency bandwidth, especially in the range close to the oscillation frequency.

When it comes to detecting filling levels, which in the meantime has become the largest field of application for capacitive sensors (with a rising tendency), a physical distinction should be made between two areas of application:

1) media without conductivity and without a dipolar character on the part of the molecular structure (oil, plastic granules, powders, solids),
2) conductive, liquid media (water, acids, alkaline solutions, blood, mixtures thereof and other chemicals).

Figure 1:
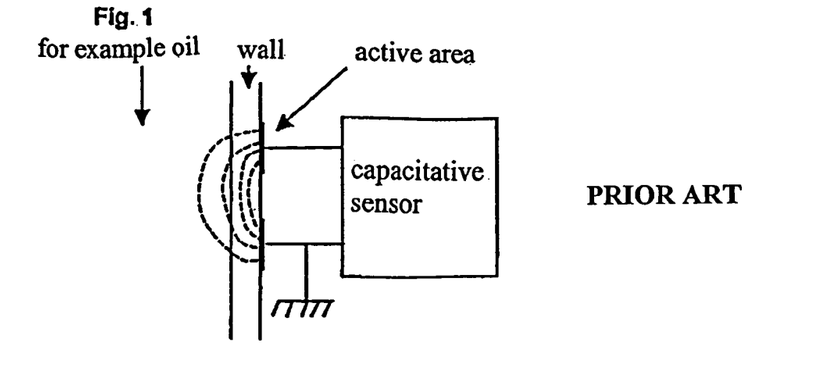
FIG. 1 the use of a capacitive sensor of the state of the art for media without conductivity and without a dipolar character on the part of the molecular structure such as oil, plastic granules or solids, by raising the total dielectric constant $\in_r$ of the container wall+$\in_r$ of the medium.

In case 1), the introduction of the medium into the active area of a capacitive sensor simply raises the total dielectric constant $\in_r$ of the container wall+$\in_r$ of the medium and thus the total capacitance of the "expanded" plate capacitor between the active surface and the intrinsic mass (often also configured as the second electrode). This is shown in FIG. 1.

For the most part, the field lines run directly between the two expanded capacitor plates or electrodes through the container wall and through the medium to be detected. All that is detected is the $\in_r$ growth due to the medium. If the non-conductive medium forms thin films or adhesions on the inside wall of the container, then their $\in_r$ is much less than the $\in_r$ of the full vessel because, for the most part, the field lines run through the air and not through the medium. This is why in actual practice, the monitoring of the level of such media is usually done in a satisfactory manner with the existing technology. Such applications are restricted at most by container walls that are too thick and that hold a medium having an $\in_r$ that is too low, or else by technical aspects having to do with EMC.

Other physical conditions ensue in the case of conductive media (case 2), which are the ones the occur by far with the greatest frequency in actual practice.

Figure 2:
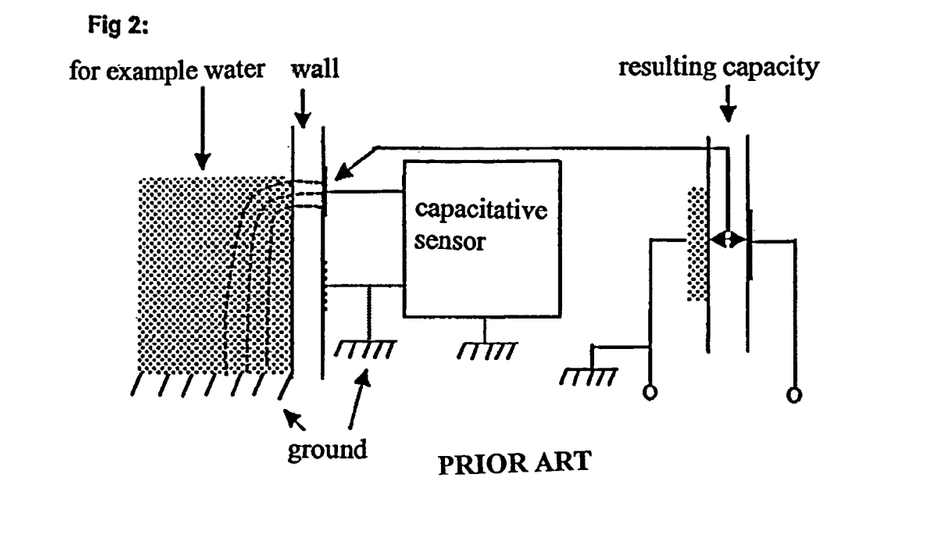
FIG. 2 the use of a capacitive sensor of the state of the art for conductive media, whereby here, the capacitance between the active sensor surface and the conductive medium on the opposite side is detected.

At high conductivities, the medium itself virtually functions as the second capacitor plate or as the antipole to the active surface. It is no longer the Er of the medium itself that is detected but rather the capacitance between the active sensor surface and the conductive medium on the opposite side. The medium functions like a grounded metal plate or a grounded metal block that fills the container. This is shown in FIG. 2. In large vessels or in the case of large-volume filling quantities, the ground connection is created by the high capacitance of the surface formation of the liquid relative to the "room" and the floor on which the container stands. The medium itself, owing to its electric conductivity, simply creates an electrically conductive connection to these large surface-area ground capacitances.

This is why much higher capacitance differences are found on the active surface than in case 1) as soon as the filling level reaches the sensor surface. This is due to the fact that, in an equivalent circuit diagram, an almost ideal plate capacitor is established with opposing plates and with the $\in_r$ of the container wall that is between them, insofar as the coupling of the medium vis-à-vis the ground is sufficient; right-hand part of FIG. 2.

In actual practice, many conductive media without surface tension tend to form thin films, foams or even thicker adhesions on the inside of the container if the latter was previously wetted by the medium. In many cases, capacitive sensors according to the state of the art detect these adhesions to the same degree as the full level. If the level falls far below the active sensor area, this occurrence then goes unnoticed. The application does not function or else only very unreliably. The conductive adhesion then functions almost directly like a metal plate that continues to be grounded via the liquid and the plate capacitor depicted in FIG. 2 is largely retained even though a true filling level is no longer present. This is a major fundamental problem of capacitive level measurement, FIG. 3.

Thin layers of a conductive medium, however, display lower conductivities or higher electric resistances than the compact medium because the current density increases or more electrons have to flow through a smaller volume. All capacitive methods work with alternating voltage or alternating current and thus with alternating electric fields. Consequently, a frequency-dependent capacitive reactance results from the plate capacitor or from the coupling capacitance between the active surface and the medium or the adhesion.

Figure 3:
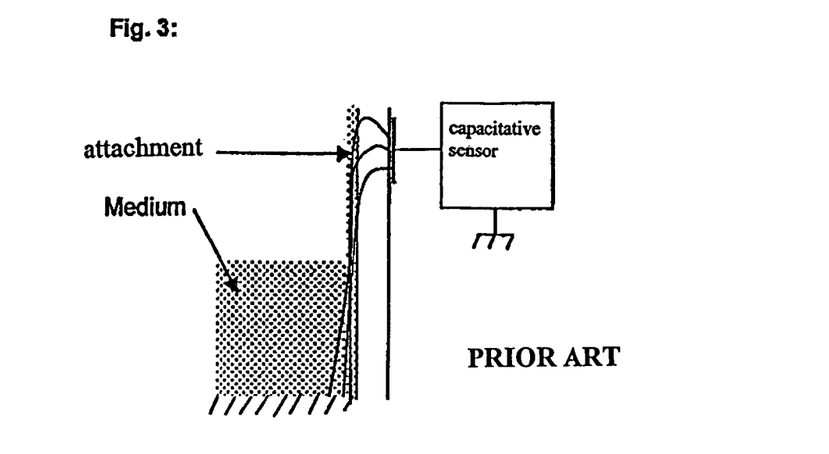
FIG. 3 the depiction in the form of a drawing of the basic problem that distorts a measurement according to the state of the art when the conductive medium without surface tension tends to form thin films, foams or even thicker adhesions on the inside of the container.
Figure 3A:
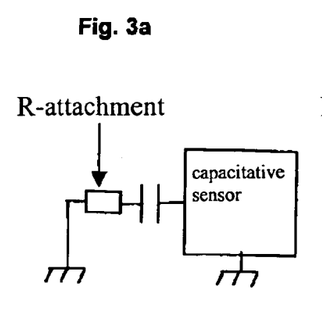
Figure 3B:
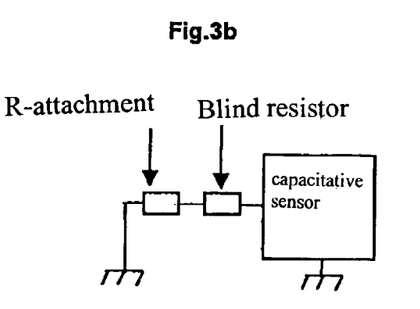

This can be depicted in a simplified manner in an equivalent circuit diagram by a series connection of the ideal plate capacitor with the resistance of the adhering film or a series connection of the reactance with the resistance of the adhering film, FIGS. 3a+b. In FIG. 3, a much smaller resistance on the part of the compact medium and a sufficiently large ground capacitance were assumed and thus these quantities were ignored.

FIG. 3b shows that, as a fundamental prerequisite, the reactance has to become sufficiently small so that the sensor can distinguish between the resistance R-adhesion and a short-circuit to the ground. By the same token, there has to be sufficient "connection to the ground". The capacitive reactance obeys the relationship $Rb=½πfC$. Therefore, the working frequency f would have to become sufficiently large.

When it comes to capacitive sensors according to the state of the art, the working frequencies are 2 MHz at the maximum. Depending on the application, this results in reactances of up to a maximum of 100 kilo-ohms or even more. The resistances of critical adhering films, however, can have values below 1 kilo-ohm down to a few 100 ohms per cm. The working frequency, however, cannot be simply set as high as desired because the radiation or emissions of the sensor would rise impermissibly. Moreover, the "closed current circuit" to the ground is disturbed since the high-frequency alternating current for the most part has to flow out via the sensor feed line that is provided with inductive characteristics. This gives rise to malfunctions, in addition to which the standards of the EMC regulations are not longer met.

DE 199 49 985 discloses an oscillatory method that decisively improves this situation in comparison to the state of the art that was known up until then. This method works in the frequency range of 5 MHz to 10 MHz and, via a second electrode, compensates for the container wall capacitance as well as for adhesions and films of the medium. In this manner, solutions can be found for applications that were impossible until then with capacitive sensors. A working frequency of about 10 MHz, however, constitutes an absolute upper limit in terms of the above-mentioned EMC regulations and functional problems.

This is why filling levels of adhering media can only be handled by this method up to a conductivity in the order of magnitude of up to about 5 ms/cm. Moreover, this technique requires an absolute ground connection. This gives rise to problems in the case of small containers and volumes of liquid. The filling levels are no longer detected or the switching point is considerably influenced by the spatial position of the container or if the measuring arrangement is touched by persons (artificial grounding). Besides, this method is susceptible to interference voltages within a certain frequency bandwidth (EMC regulations).

Higher requirements are made in many applications such as, for example, in medical technology. In a critical and concurrently important application, namely, the detection of levels of blood, for instance, in dialysis equipment or heart-lung machines, no capacitive sensors have been employed up until now. Due to its consistency and characteristics, blood tends to foam and to form thick layers of adhesions in tubes or vessels, in addition to which it has a high conductivity value. Furthermore, in medical technology, high requirements are made in terms of the interference immunity (EMC regulations) and the functional reliability of the technology.

TECHNICAL OBJECTIVE

The invention is based on the objective of improving a sensor and a method of the above-mentioned type in such a way that even conductivities above the order of magnitude of about 5 ms/cm can be reliably detected and so that the spatial position of the container or touching of the measuring arrangement by persons does not have any effect on the measured results.

DISCLOSURE OF THE INVENTION AND OF ITS ADVANTAGES

Figures 4A, 4B:
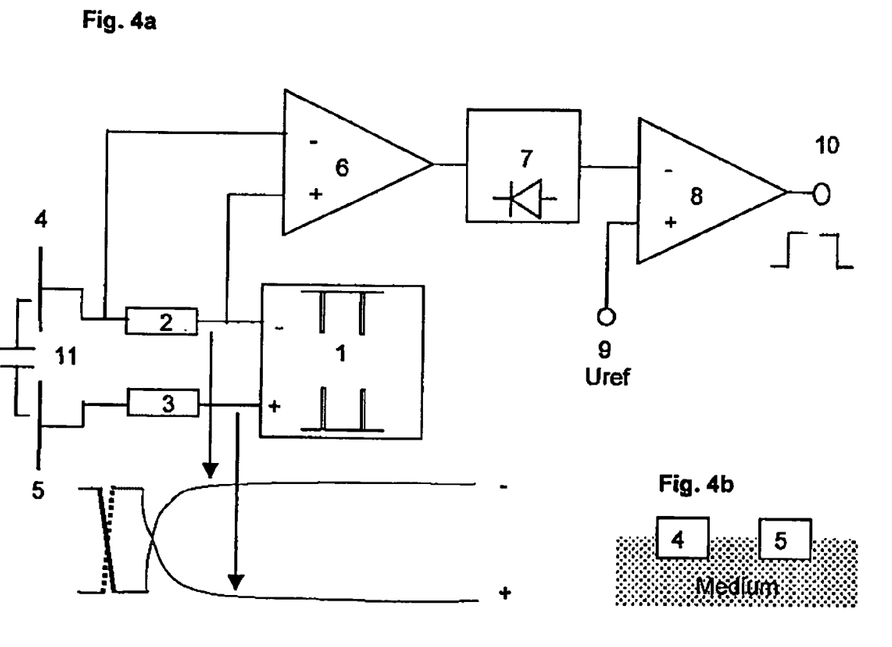
FIG. 4*a* by way of an example, a circuit diagram of a sensor according to the invention, with a measuring electrode and a counter electrode.
FIG. 4*b* the measuring electrode and the counter electrode, with a medium between them.
Figure 5:
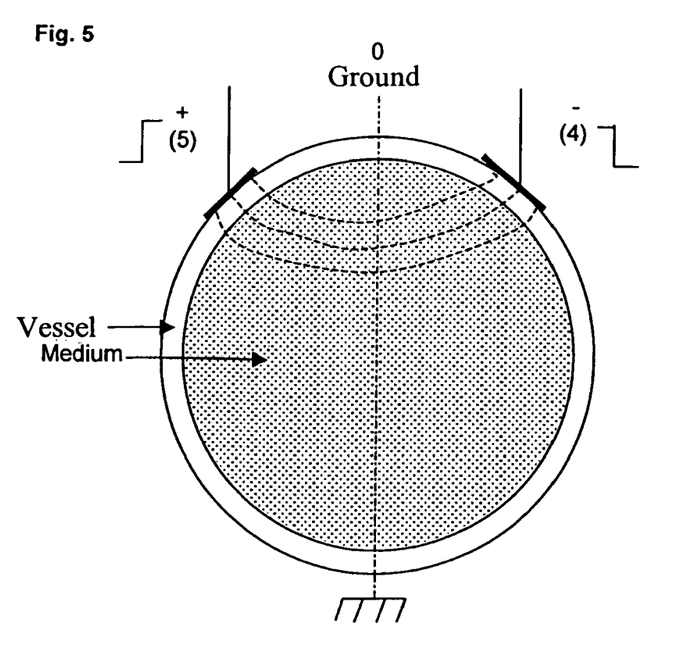
FIG. 5 a top view of a container in which a medium is being held, as well as electrodes arranged on the container wall, and the field line curve between said electrodes.

In the case of a sensor of the above-mentioned type, the achievement of this objective is characterized by a pulse generator [FIG. 4] which—by means of two mutually inverted and non-inverted brief pulses via two equivalent low-ohm resistors—actuates two identical electrodes arranged next to each other at the same height relative to the filling level of the medium and on the outside wall of the container, and characterized by a fast-action difference amplifier that has a high common-mode rejection and that taps a voltage drop caused by the level-dependent pulse current at one of the two resistors, namely, the measuring resistor, then said difference amplifier amplifies this voltage drop by a fixed factor and feeds it to a downstream peak detector with filtering in order to obtain a level-dependent direct voltage and also feeds it to a downstream voltage comparator which, by comparing the output voltage of the peak detector to an adjustable setpoint voltage, generates a switching signal that changes from "low state" to "high state" as soon as a rising filling level causes the electrodes to be sufficiently covered and conversely when the filling level sinks below the electrodes or reacts inversely to the change in the filling level as soon as the polarity of one of the stages consisting of the pulse generator, the difference amplifier, the peak detector and the voltage comparator is inverted.

In another embodiment of the invention, the inverted and non-inverted brief pulses of the pulse generator are exactly in phase opposition with respect to each other and have a steep edge. Moreover, the electrodes can have a geometrical shape that is appropriately adapted to the wall of the container.

In another embodiment of the sensor according to the invention, after a measuring pulse has ended, the difference amplifier [FIG. 4] is switched off for the period of time until the beginning of the next measuring pulse.

In another embodiment of the sensor according to the invention, the voltage drop at the second resistor is evaluated by a second difference amplifier that is identical to the difference amplifier that has a high common-mode rejection, except that its inputs are connected inversely and it is likewise evaluated by a peak detector that is identical to the peak detector located downstream, and the measuring voltages of both branches are fed via a summator network from two identical resistors to the shared output comparator, whereby both branches are also monitored by the test pulse.

In another embodiment of the sensor according to the invention, the voltage drop that occurs at one of the two resistors is amplified by a fixed factor in the order of magnitude of 5 to 50.

Figure 8:
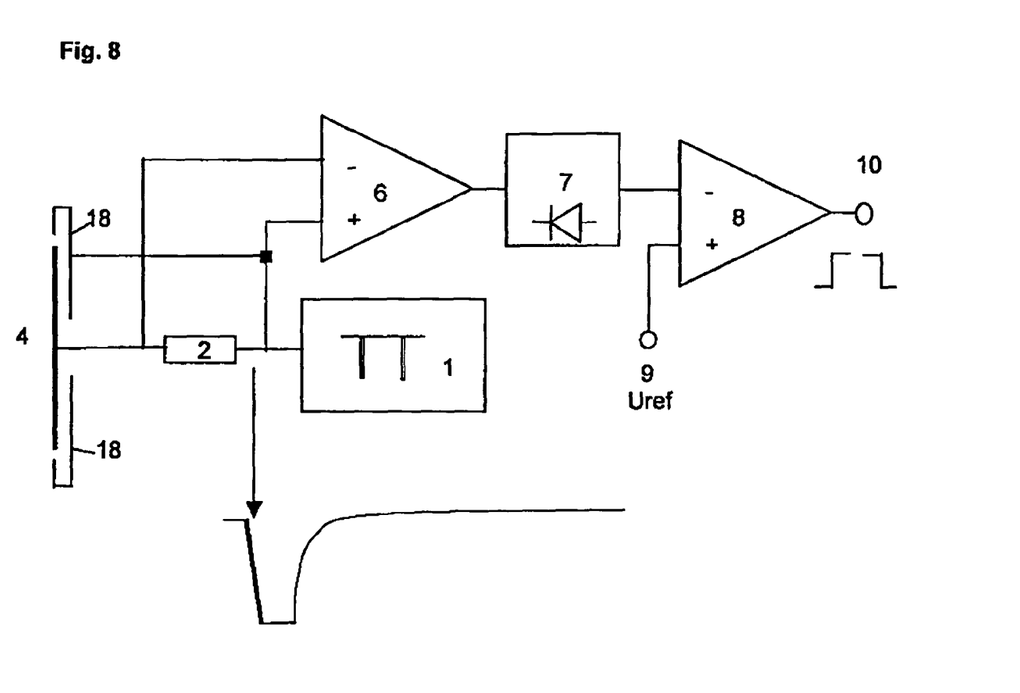
FIG. 8 by way of an example, a circuit diagram of another sensor according to the invention which is structured in a simplified manner in comparison to the sensor from FIG. 4, except that it has only one measuring electrode with a resistor, whereby this embodiment shows the more general circuitry.

In the case of a sensor for the contactless detection of the level of a liquid and adhering high-conductivity medium, especially blood, through a non-metal container wall, the objective is also achieved by a pulse generator [FIG. 8] that generates brief pulses which, via a low-ohm resistor, namely, the measuring resistor, actuate an electrode, namely, the measuring electrode, installed on the outside of the container wall, and it is also achieved by a fast-action difference amplifier that has a high common-mode rejection and that taps a voltage drop at the measuring resistor caused by the level-dependent pulse current, then said difference amplifier amplifies this voltage drop by a fixed factor and feeds it to a downstream peak detector with filtering in order to obtain a level-dependent direct voltage and also feeds it to a downstream voltage comparator which, by comparing the output voltage of the peak detector to an adjustable setpoint voltage, generates a switching signal that changes from "low state" to "high state" as soon as a rising filling level causes the measuring electrode to be sufficiently covered and conversely when the filling level sinks below the measuring electrode or reacts inversely to the change in the filling level as soon as the polarity of one of the stages consisting of the pulse generator, the difference amplifier, the peak detector and the voltage comparator is inverted.

In a preferred embodiment of the invention, the pulse generator [FIG. 4] is one that, via two outputs, generates emittable brief pulses that are inverted and non-inverted with respect to each other and that are in phase opposition with respect to each other, and the resistor is divided into two equivalent low-ohm resistors and, by the same token, the electrode is divided into two identical electrodes arranged next to each other on the outside wall of the container at the same height relative to the level of the medium, namely, a measuring electrode and a counter electrode, which are each actuated by the different pulses of the pulse generator.

In another embodiment of the invention, the measuring electrode is provided with a shield electrode arranged on the back and connected to the minus output of the pulse generator, as a result of which this arrangement is capable of carrying out asymmetrical filling level measurements vis-a-vis the ground.

Figure 6:
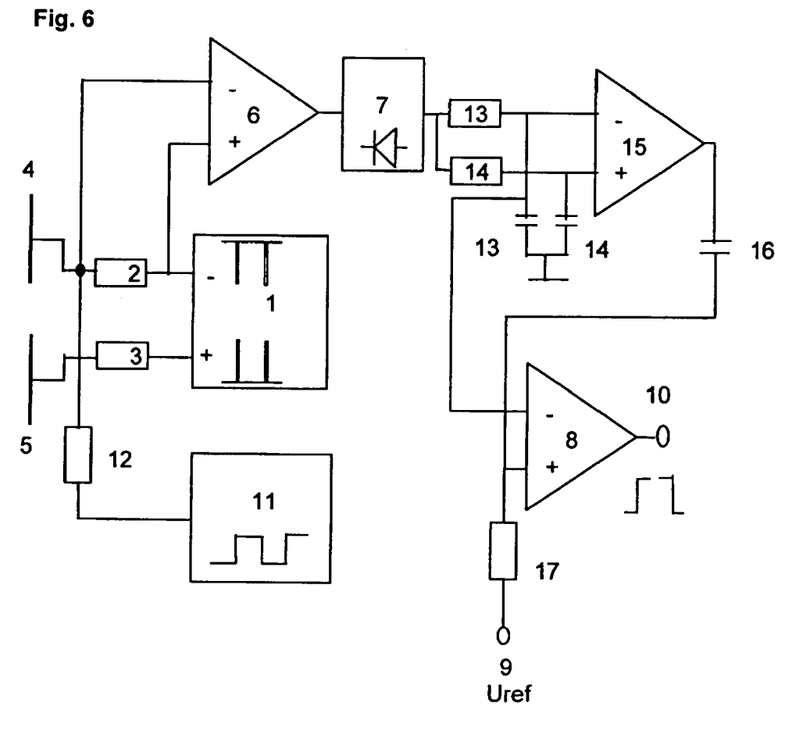
FIG. 6 by way of an example, a circuit diagram of a sensor according to the invention, with self-monitoring.
Figure 7:
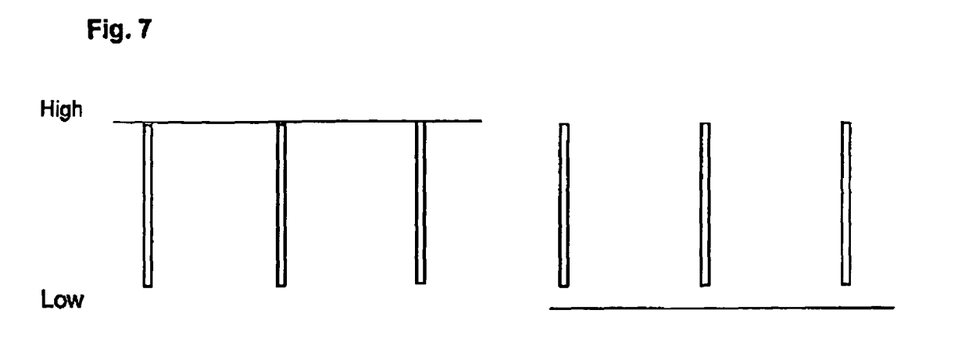
FIG. 7 a depiction of the output voltage at the output comparator according to FIG. 6.

In another embodiment, the invention is characterized by an implementation of self-monitoring [FIG. 6] of the function in that a square-wave generator feeds a test square wave having a low frequency (10 Hz to 200 Hz) via a high-ohm resistor to the one electrode, namely, the measuring electrode, whereby in the positive half-wave of said test square wave, the measuring current is raised by the measuring resistor while, in the negative half-wave of said test square wave, the measuring current is lowered by the measuring resistor, and these fluctuations in the measuring current are superimposed as a "ripple" in the form of a square wave at the output of the peak detector of the measuring direct voltage, and characterized by a low-frequency RC low-pass filter having a low limit frequency and located downstream from the peak detector, said filter once again filtering out the superimposed portion and feeding the pure measuring voltage to the output comparator, and characterized by an RC low-pass filter having a higher limit frequency likewise located downstream from the peak detector, said low-pass filter then feeding the superimposed portion to a comparator that, by comparing the filtered measuring voltage to the superimposed portion, regenerates the test square wave so as to have a steep edge and, via an RC high-pass filter, forms positive and negative needle pulses from the edges and superimposes these needle pulses onto the adjustable setpoint voltage at the output comparator, so that the appertaining polarity of the level-dependent output signal changes briefly at time intervals prescribed by the testing frequency [FIG. 7] and the presence of these test pulses can be evaluated by the user as the pre-requisite for smooth functioning of all switching components at the output.

A method according to the invention for the contactless detection of the level of a liquid and adhering high-conductivity medium, especially blood, through a non-metal wall of a container, is characterized by a pulse generator that generates brief pulses which, via a low-ohm resistor, namely, the measuring resistor, actuates an electrode, namely, the measuring electrode, arranged on the outside wall of the container and the method is also characterized by a fast-action difference amplifier that has a high common-mode rejection and that taps a voltage drop caused by the level-dependent pulse current at the measuring resistor, that amplifies this voltage drop by a fixed factor and that feeds it to a downstream peak detector with filtering in order to obtain a level-dependent direct voltage and also feeds it to a downstream voltage comparator which, by comparing the output voltage of the peak detector to an adjustable setpoint voltage, generates a switching signal that changes from "low state" to "high state" as soon as a rising filling level causes the electrode to be sufficiently covered and conversely when the filling level sinks below the electrode or reacts inversely to the change in the filling level as soon as the polarity of one of the stages consisting of the pulse generator, the difference amplifier, the peak converter and the voltage comparator is inverted.

In a preferred embodiment of the method according to the invention, the pulse generator [FIG. 4] used is one that, via two outputs, generates emittable brief pulses that are inverted and non-inverted with respect to each other, and the resistor is divided into two equivalent low-ohm resistors and, by the same token, two identical electrodes arranged next to each other on the outside wall of the container at the same height relative to the level of the medium are used, namely, a measuring electrode and a counter electrode, which are each actuated by the different pulses of the pulse generator.

Another embodiment of the method according to the invention is characterized by a pulse generator that generates brief pulses which, via a low-ohm resistor, namely, the measuring resistor, actuates an electrode, namely, the measuring electrode, arranged on the outside wall of the container and the method is also characterized by a fast-action difference amplifier that has a high common-mode rejection and that taps a voltage drop caused by the level-dependent pulse current at the measuring resistor, that amplifies this voltage drop by a fixed factor and that feeds it to a downstream peak detector with filtering in order to obtain a level-dependent direct voltage and also feeds it to a downstream voltage comparator which, by comparing the output voltage of the peak detector to an adjustable setpoint voltage, generates a switching signal that changes from "low state" to "high state" as soon as a rising filling level causes the measuring electrode to be sufficiently covered and conversely when the filling level sinks below the measuring electrode or reacts inversely to the change in the filling level as soon as the polarity of one of the stages consisting of the pulse generator, the difference amplifier, the peak converter and the voltage comparator is inverted.

Another embodiment of the method according to the invention is characterized by an implementation of self-monitoring [FIG. 6] of the function in that a square-wave generator feeds a test square wave having a low frequency, for example, 10 Hz to 200 Hz, via a high-ohm resistor to the one electrode, namely, the measuring electrode, whereby in the positive half-wave of said test square wave, the measuring current is raised by the measuring resistor while, in the negative half-wave of said test square wave, the measuring current is lowered by the measuring resistor, and these fluctuations in the measuring current are superimposed as a "ripple" in the form of a square wave at the output of the peak detector of the measuring direct voltage, and characterized by a low-frequency RC low-pass filter having a low limit frequency and located downstream from the peak detector, said filter once again filtering out the superimposed portion and feeding the pure measuring voltage to the output comparator and characterized by an RC low-pass filter having a higher limit frequency likewise located downstream from the peak detector, said low-pass filter then feeding the superimposed portion to a comparator that, by comparing the filtered measuring voltage to the superimposed portion, regenerates the test square wave so as to have a steep edge and, by means of an RC high-pass filter, forms positive and negative needle pulses from the edges and superimposes these needle pulses onto the adjustable setpoint voltage at the output comparator, so that the appertaining polarity of the level-dependent output signal changes briefly at time intervals prescribed by the testing frequency [FIG. 7] and the presence of these test pulses can be evaluated by the user as the prerequisite for smooth functioning of all switching components at the output.

BRIEF DESCRIPTION OF THE DRAWING, IN WHICH THE FOLLOWING IS SHOWN

FIGS. 3 *a*+*b* two equivalent circuit diagrams from FIG. 3 in order to depict the coupling capacitance between the active surface and the medium or the adhesion by a series connection of the ideal plate capacitor with the resistance of the adhering film or of a series connection of the reactance with the resistance of the adhering film;

WAYS TO CARRY OUT THE INVENTION AND BEST EMBODIMENT

Therefore, the inventive arrangement according to FIG. 4 described below avoids the above-mentioned drawbacks of the current state of the art, in addition to which it allows the detection of media having higher conductivities.

A pulse generator 1 generates square-wave pulses with a short pulse duration and pronounced edge steepness, in a manner that is direct and inverted exactly in phase opposition. Via a measuring resistor 2, which is one of two resistors 2 and 3, the inverted pulse feeds a measuring electrode 4, which is one of two electrodes 4 and the counter electrode 5, while the non-inverted pulse feeds the counter electrode 5 via the resistor 3 having the same value as the resistor 2. The electrodes 4 and 5 are arranged symmetrically to each other. In the presence of a measuring capacitance 11—caused by the filling level of a medium between the electrodes 4 and 5 or between the electrode 4 and the ground—said measuring capacitance 11 and the resistors 2, 3 give rise to a high and brief current load pulse. The resultant voltage drop at the resistor 2 is amplified by a fast-action difference amplifier 6 having a high common-mode rejection and the peak value is fed as a filtered direct voltage to a voltage comparator 8 by the detector 7. The voltage comparator 8 compares the peak voltage to a reference voltage 9—that can be set, for instance, by means of a potentiometer—as the threshold and emits a switching signal at its output 10 whenever the value rises above or falls below this threshold or above or below the filling level relative to the electrodes 4, 5. The sensitivity of the sensor is set with the adjustable reference voltage 9.

The subject matter of the invention entails the following advantages:

The measurement by the sensor only takes place during the falling edge of the inverted pulse or the rising edge of the non-inverted pulse. This is shown in FIG. 4 by the thicker part of the signal curve at the pulse generator. The edge steepness in this region has to be very high, namely, a few ns/10V. This yields a high, brief current pulse, also due to very small measuring capacitances. The steep edge contains high-frequency portions all the way to the range of 100 MHz, as a result of which the reactance of the coupling capacitance to the medium is greatly minimized. Owing to the low pulse/pause ratio or to a low repetition frequency in the range from 10 KHz to a maximum of 500 KHz of the narrow pulses (pulse duration of 10 ns to 100 ns), however, the emitted spectral energy is altogether very low, even though the sensorial effect of the arrangement is as good as if it were operating at a very high working frequency having a periodic function. Due to the minimized reactance of the coupling to the medium during the measurement, it is almost as though the measuring electrode were sub-merged directly in the medium. A pure capacitance between the electrodes yields maximum pulse currents, while a series connection of a resistor with the measuring capacitance leads to a pronounced reduction in the pulse current. Therefore, the measuring arrangement can distinguish, even contactless, between higher conductivities of an adhering film, or of foams, and the highest conductivity of the compact medium.

An RC series connection, which electrically represents the adhering film, FIG. 3, leads to a pronounced reduction in the pulse current and thus to a reduction in the voltage drop at the resistor 2, as a result of which the arrangement according to the invention is capable of providing large voltage differences between the true filling level and a mere adhesion. A prerequisite for this is small values of the resistors 2 and 3 in the range from 2 kilo-ohm to a few 100 ohm.

Another advantage of the subject matter and of the method according to the invention in comparison to the state of the art results from the feed of a pulse that is exactly in phase opposition at the electrode 5. Due to the high counter potential at the electrode 5, the electric field lines no longer strive through the medium via the ground capacitance relative to the ground as is the case in the state of the art, but rather, they strive through the medium towards the counter electrode 5. Precisely in the middle between the electrodes, under electrically and geometrically symmetrical conditions, the result is a virtual 0 potential that is identical to the ground potential. Consequently, the above-mentioned problems of the sensitivity to touch or of the spatial position of the container are completely eliminated. The ground capacitance no longer plays any role whatsoever. Irrespective of the amount of liquid or of the spatial position of the container, one always obtains the same, reproducible measured results. The measuring current no longer flows from one electrode towards the ground but rather, only between the two electrodes. The "current circuit" is thus closed via the two electrodes or within the sensor according to the invention. Consequently, there is no return flow of the measuring current via the supply voltage feed line, switching signal, as a rule 3 wires, of the sensor according to the invention leading towards the ground or earth. Therefore, this completely eliminates the above-mentioned malfunctions as well as the emitted interferences, which are already markedly reduced anyway due to the low repetition frequency.

Another advantage of the sensor and the of method according to the invention in comparison to the usually oscillatory methods according to the state of the art is the much higher interference immunity vis-à-vis electric interfering alternating fields. The measuring methods according to the state of the art for the most part operate with a periodical function having less energy and they measure constantly. The sensor according to the invention only measures during the brief pulse duration or within a brief time span using higher energy or voltage having a pulse height of 10 V or more. This translates into two facts regarding the interference immunity: the higher energy yields a high useful signal. An interference signal that is superimposed on the measuring current first has to be of this same order of magnitude before it can exert any influence on the measured result.

Moreover, the measuring amplifier 6 is "switched dead" for most of the time aside from the brief time span, so that interference fields do not exert any influence during this period of time. The most recently measured value remains temporarily stored in the filter of the detector 7 until the next pulse edge.

In the realm of medical functions such as the monitoring of the filling level of blood in heart-lung machines, upon which the life of a patient depends, high requirements are made in terms of the functional reliability of the technology employed, extending all the way to constant self-monitoring of the equipment's own function. In the case of the sensor according to the invention shown in FIG. 4, it is technically very easy to implement self-monitoring to check the flawless function of the sensor, FIG. 6.

A square-wave generator 11 feeds a square-wave function or a low-frequency test pulse to the measuring electrode 4 via a high-ohm resistor 12. In the positive half-wave of the square-wave generator 11, the capacitive measuring current is slightly raised by the resistor 2. Therefore, the test square-wave function appears downstream from the detector 7 as an envelope curve that is superimposed with a small amplitude onto the rectified measuring voltage. The measuring voltage passes through two RC low-pass filters, one having a small time constant 14 and one having a large time constant 13. The test square-wave voltage is filtered off through the RC low-pass filter 13 and the pure measuring direct voltage is fed to the output comparator 8. In contrast, the test function is still present down-stream from the RC low-pass filter 14 and it is fed to the comparator 15. Due to its high open-circuit voltage factor, the comparator 15 regenerates the test square-wave function. The edges of the test square wave are differentiated into positive and negative needle pulses by the RC high-pass filter 16, 17, said needle pulses being superimposed on the reference voltage Uref 9. Thus, depending on the state of actuation, only in case of negative needle pulses or only in case of positive needle pulses, the output comparator 8 toggles briefly out of the low-state into the high-state or vice versa. The output comparator 8 supplies the switching signal "high" when the filling level has reached the area of the electrodes 4, 5 and then goes into the low state when the filling level lies below 4 and 5. Then, as a function of the frequency of the square-wave generator, this output voltage is superimposed at regular intervals with a brief test pulse or the switching state in question is changed for a brief moment as shown in FIG. 7.

The test pulse passes through all stages of the sensor according to the invention all the way to the output. Thus, its components or its function are monitored almost 100%. If the pulses at the output disappear, this means there is a fault and an alarm can be triggered. The presence of the pulses can be checked by the user, for instance, by means of capacitance uncoupling and rectification as well as by means of other evaluation circuitries. Switching elements actuated by the sensor such as, for example, a relay, are not interfered with by the pulses because the switching signal is too brief. The test repetition frequency can be within the range from about 10 Hz to 200 Hz.

FIG. 8 shows by way of an example a circuit diagram of another sensor according to the invention which is structured in a simplified manner in comparison to the sensor from FIG. 4 and having only one measuring electrode with a resistor, whereby this embodiment shows the general circuitry.

INDUSTRIAL APPLICABILITY

In particular, the invention can be industrially employed to measure the filling levels of high-conductivity liquid and adhering media, especially blood. The invention provides a device and a method for the contactless detection of such filling levels through the non-metal walls of a container in compliance with stringent EMC requirements while also allowing self-monitoring.

The invention claimed is:

1. A sensor for the contactless detection of the level of a liquid and adhering high-conductivity medium, especially blood, through a non-metal wall of a container characterized by:
   a pulse generator, (1) capable of generating a signal of non-inverted brief pulses and a separate signal of inverted brief pulses
   a first low-ohm resistor (2) which receives a signal of inverted brief pulses from said pulse generator,
   a second low-ohm resistor (3), equivalent to said first low-ohm resistor, which receives a signal of non-inverted brief pulses from said pulse generator,
   a first electrode (4) connected to said first low-ohm resistor (2) and actuated by said inverted brief pulses, a second electrode (5), identical to said first electrode, connected to said second low-ohm resistor (3) and actuated by said non-inverted brief pulses wherein said first and second electrodes are arranged next to each other at the same height relative to the filling level of the medium and on the outside wall of the container, a fast-action difference amplifier that has a high common-mode rejection (6) that taps a voltage drop caused by the filling level-dependent pulse current across said first resistor (2), wherein said difference amplifier amplifies said voltage drop by a fixed factor, a peak detector (7) connected to the output of said difference amplifier wherein said peak detector filters the output and obtains a filling level-dependent direct voltage, a first voltage comparator (8) connected to the output of the peak detector, which, by comparing the output voltage of the peak detector (7) to an adjustable setpoint voltage (9), generates a switching signal that changes from "low state" to "high state" as soon as a rising filling level causes the first and second electrodes (4, 5) to be sufficiently covered and changes from "high state" to "low state" when the filling level sinks below the first and second electrodes (4, 5) or reacts inversely to the change in the filling level as soon as the polarity of one of the components consisting of the pulse generator (1), the difference amplifier (6), the peak detector (7) and the first voltage comparator (8) is inverted.

2. The sensor according to claim 1, characterized in that the inverted and non-inverted brief pulses of the pulse generator are exactly in phase opposition with respect to each other and have a steep edge.

3. The sensor according to claim 1, characterized in that the electrodes (4, 5) have a geometrical shape that is appropriately adapted to the wall of the container.

4. The sensor according to claim 1 characterized in that, after a pulse has ended, the difference amplifier (6) is switched off for the period of time until the beginning of the next pulse.

5. The sensor according to claim 1, characterized in that the voltage drop that occurs at the first resistor (2) is amplified by a fixed factor of 5 to 50.

6. The sensor according to claim 1, characterized by an implementation of self monitor of the circuit function comprising:

a square-wave generator (11) that feeds a test square wave having a frequency of 10 Hz to 200 Hz via a high-ohm resistor (12) to the first electrode (4), whereby in the positive half-wave of said test square wave, the measuring current is raised by the first resistor (2) while, in the negative half-wave of said test square wave, the measuring current is lowered by the first resistor (2), and these fluctuations in the measuring current are superimposed as a "ripple" in the form of a square wave at the output of the peak detector (7) of the measuring direct voltage, a low-frequency RC low-pass filter (13) having a low limit frequency and connected to the output of the peak detector (7), said filter filtering out the superimposed portion and feeding the pure measuring voltage to the output comparator (8), an RC low-pass filter (14) having a higher limit frequency likewise connected to the output of the peak detector (7), said low-pass filter then feeding the superimposed portion to a second comparator (15) that, by comparing the filtered measuring voltage to the superimposed portion, regenerates the test square wave so as to have a steep edge, an RC high-pass filter (16) (17) connected to the output of the second comparator (15), that generates positive and negative needle pulses from the edges of the regenerated test square wave and superimposes these needle pulses onto the adjustable setpoint voltage (9) at the first voltage comparator (8) so that the appertaining polarity of the level-dependent output signal (10) changes briefly at time intervals prescribed by the testing frequency and the presence of these test pulses can be evaluated by a user as a prerequisite for smooth functioning of all switching components.

7. The sensor according to claim 6 further comprising:

a second difference amplifier (6a) that is identical to the first difference amplifier (6) that taps the voltage drop across the second resistor (3) wherein the inputs of the second difference amplifier are connected with opposite polarity with respect to those of the first difference amplifier, a second peak detector (7b), identical to the first peak detector (7) connected to the output of the second difference amplifier wherein the outputs of both peak detectors are fed via a summator network from two identical resistors to the output comparator (8), with both branches monitored by the test pulse.

8. A sensor for the contactless detection of the level of a liquid and adhering high-conductivity medium, especially blood, through a non-metal container wall, characterized by:

a pulse generator (1) that generates brief pulses a low-ohm resistor (2) connected to said pulse generator (1)

an electrode (4), namely, the measuring electrode, installed on the outside of the container wall, wherein said electrode is connected to said resistor and is actuated by the pulses generated by the pulse generator, a shield electrode (18) arranged at least partially behind the measuring electrode on the side opposite the container wall and directly connected to the output of the pulse generator a fast-action difference amplifier that has a high common-mode rejection (6) and that taps a voltage drop at the resistor (2) caused by the filling level-dependent pulse current wherein said difference amplifier amplifies this voltage drop by a fixed factor, a peak detector (7), connected to the output of said difference amplifier wherein said peak detector filters the output and obtains a filling level-dependent direct voltage, a voltage comparator (8), connected to the output of the peak detector (7), which, by comparing the output voltage of the peak detector (7) to an adjustable setpoint voltage (9), generates a switching signal that changes from "low state" to "high state" as soon as a rising filling level causes the measuring electrode (4) to be sufficiently covered and changes from "high state" to "low state" when the filling level sinks below the measuring electrode (4) or reacts inversely to the change in the filling level as soon as the polarity of one of the components consisting of the pulse generator (1), the difference amplifier (6), the peak detector (7) and the voltage comparator (8) is inverted.

* * * * *